United States Patent Office 3,020,245
Patented Feb. 6, 1962

3,020,245
PREPARATION OF CATALYSTS CONTAINING COBALT AND MOLYBDENUM OXIDES
Ronald E. Reitmeier, Middletown, Ky., assignor to Catalysts and Chemicals Inc., Louisville, Ky., a corporation of Delaware
No Drawing. Continuation of application Ser. No. 736,987, May 22, 1958. This application May 27, 1959, Ser. No. 816,080
2 Claims. (Cl. 252—465)

This invention relates to the preparation of catalysts suitable for use in the desulfurization of hydrocarbon fractions such as petroleum gas, vapors and liquids, and has special application to the preparation of an improved catalyst containing oxides of cobalt and alumina.

This application is a continuation of my co-pending application Serial Number 736,987, filed May 22, 1958, now abandoned.

Most petroleum fractions contain sulfur which is ordinarily present principally in the form of organic sulfur compounds. In many instances the sulfur content in such petroleum fractions is so high as to render them objectionable for sale and for further processing over sulfur-sensitive catalysts. In other instances various distillates are so high in sulfur as to render them objectionable for such uses as cracking stocks or as motor fuels and the like.

Various types of treating methods have been proposed for eliminating sulfur compounds from petroleum distillates. For example, mercaptans which are principally responsible for the objectionable odor, have been converted to less odorous sulfides by a familiar sweetening process such as the doctor treatment. This does not reduce the total sulfur in the distillate and since disulfides are as deleterious in their effects on octane number and lead susceptibility as the parent mercaptans, such processes do not improve the gasoline in these respects.

Other types of treatment have been employed which generally are only effective for mercaptans but not for the refractory ring-type sulfur compounds which generally are the predominating impurity in many stocks. Sulfuric acid has been used and is effective for most types of sulfur compounds; however, such treatment becomes somewhat expensive in stocks containing appreciable proportions of olefins due to the polymerization of said olefins and consequent loss thereof.

The most commonly accepted method of desulfurizing such stocks involves vapor phase catalytic treatment in which organic sulfur compounds are converted to materials which can be removed by simple methods such as caustic scrubbing. Such methods are commonly called hydrodesulfurization or hydrotreating and utilize catalysts comprising the oxides of cobalt and molybdenum supported on activated alumina. Catalysts of this type are extremely rugged and will reduce the organic sulfur and basic and organic nitrogen compounds to an extent suitable for further treatment over the easily poisoned platinum catalysts.

In a single stage desulfurization process, the feedstock is vaporized and mixed with hydrogen and the resulting vapor is passed over a desulfurization catalyst of the type indicated at a temperature between 650 and 850° F. Under these conditions the sulfur compounds present in the feedstock are largely decomposed with the formation of hydrogen sulfide, and when olefins are present, these are largely hydrogenated. The catalyst life between regenerations is long and hydrogen sulfide is present in the product gas throughout almost the entire catalyst life.

Such processing of sulfur-bearing hydrocarbon stocks has long been known as well as the catalyst compositions which are used therein. Early desulfurization procedures involving catalyst compositions containing group 6 and group 8 metal oxides or sulfides were described as early as 1924 by Meigs in U.S. Patent 1,467,781 and again in 1930 in British Patent 345,738. In 1932 Krauch et al. in U.S. Patent 1,890,436 disclosed the use of compounds of molybdenum admixed with compounds of iron or cobalt and various carrier substances such as alumina, zinc oxide, magnesia or calcium carbonate. Dorrer in U.S. Patent 1,908,286 disclosed the use of a catalyst containing cobalt sulfide and molybdenum sulfide supported on fuller's earth for the catalytic desulfurization and denitrification of American gas oil and disclosed that alumina gel might be used as a suitable carrier.

At an early date, it was possible with such catalysts, by the use of low space velocities, high pressures, sub cracking temperatures and high hydrogen to hydrocarbon ratios to achieve better than 90% removal of sulfur. However, changing economic conditions in addition to changes in refining operation itself, requiring further treatment of petroleum fractions over expensive and poison-sensitive noble metal catalysts, have dictated the need for better and better hydrodesulfurization catalysts. That need is reflected in the voluminous literature on the subject relative to the preparation of improved catalysts containing oxides of cobalt and molybdenum on alumina, which are by common usage termed cobalt moly or cobalt molybdate catalysts. Such methods may be roughly broken into three major classifications which include precipitation, impregnation and simple mechanical admixture.

Superior catalysts are to some extent dependent upon the surface area, pore size distribution and dispersion of catalytic ingredients upon the carrier substance. Accordingly the catalysts prepared by precipitation or impregnation are generally superior to those prepared by mechanical admixture. Catalysts prepared by wet mixing of the ingredients are superior to those prepared by dry mixing due to the better dispersion of the ingredients. Nevertheless each method has its own inherent disadvantages. For example, catalysts prepared by precipitation of all the ingredients are expensive because of the cost of the metallic salts and reagents, the unit operations involved and the equipment which includes such items as dissolving tanks, precipitation tanks, washing apparatus, filter presses, etc. Impregnation methods are complicated by the relative insolubility of most cobalt compounds in alkaline solutions and the relative insolubility of most molybdenum compounds in acid solutions. Thus to obtain a suitably stable ammoniacal solution of both cobalt and molybdenum, copious amounts of ammonia must be utilized. Other complexing agents, such as citric or malic acid increase the cost of preparing such catalysts. Further, the impregnated catalysts show a tendency of the catalytic constituents to migrate from the pores of the carrier material unless other expensive materials are added to the impregnating solution, thus increasing the cost of production. At best, catalysts prepared by dipping calcined carrier pellets into an impregnating solution require two calcinations thus doubling the load on the calcination furnaces and substantially increasing the time schedule for production.

Accordingly, it is an object of this invention to provide a simple and economical method of preparing active cobalt oxide-molybdenum oxide catalysts. A more specific object of this invention is to provide a method of producing such catalysts which eliminates many of the operational steps and items of equipment normally associated with catalyst production.

According to this invention, catalysts are prepared by simply admixing hydrated alumina, a high surface area, porous carrier (hereinafter called "grog"), a compound of molybdenum and a compound of cobalt with a mineral acid agent until a plastic mass is formed due to the acidification of the hydrated alumina. The plastic admixture may then be formed into various shapes by suitable means such as the well-known extrusion and pelleting techniques. For the purpose of this invention the hydrated alumina when mixed in the presence of a strong acid, assumes a rubbery, plastic consistency and upon drying and calcination shrinks into a hard, porous mass having exceptional physical strength. The peptizable hydrated alumina which is used in accordance with the invention contains from 15 to 35% by weight of combined water, e.g., water of hydration. Grog may be defined as a porous, high surface area carrier material which includes certain crystalline aluminas, calcined zirconia, titania, spent catalyst, activated carbon and various adsorbent and plastic clays. Acidifying agents include the radicals of strong acids such as nitric, sulfuric and hydrochloric acids and the acid salts thereof which exhibit an acid reaction.

While it is not intended to limit the scope of this invention by any theory or postulation, it is nevertheless believed that the grog functions to provide the proper pore size in the finished catalyst for optimum activity. Accordingly it is desirable to utilize materials possessing a large surface area and containing a large percentage of pores having a diameter within the range of from 20 to 100 angstroms and a surface area of from 30 to 350 square meters per gram. Suitable materials include activated alumina, spent cobalt moly catalyst, steam deactivated silica-alumina cracking catalyst, etc. Of course, the grog may serve other functions. For example, I have found that addition of kaolin or ball clay serves to improve the heat stability of the finished catalyst and also provides some bonding action.

From the viewpoint of mechanical strength, porosity and economy, I prefer to take advantage of the unique properties imparted by two or more distinct types of grog such as kaolin and activated alumina by utilizing two or more of such types in preparing these catalysts. I have found that catalysts to which no grog has been added are insufficiently active and because of the rubbery consistency of the mass are difficult to form into shapes.

The cobalt constituent is preferably obtained by dissolving metallic cobalt in acid and utilizing the cobalt salt as one constituent of the mixture. However, any easily decomposable salts such as cobalt acetate may be utilized with advantage. The molybdenum constituent may be either a soluble or an insoluble salt. I have obtained good results using the insoluble molybdenum trioxide; however, ammonium paramolybdate or ammonium molybdate may be utilized if desired.

In utilizing the method of this invention, it will be appreciated that considerable economy in time and equipment may be effected. Thus, if the starting materials are judiciously selected, there is little contamination, thereby eliminating the need for washing. The peptized material may be immediately extruded without the need of even a drying step. The need for equipment such as precipitation tanks, impregnation vats, filter presses and thickener-washing apparatus is completely eliminated as well as the time involved in operations in which such items of equipment are used.

Reference is now made to examples of preparation of catalysts containing at least one compound of cobalt and at least one compound of molybdenum.

EXAMPLE 1

Catalysts containing on a final basis 3.5% cobalt oxide, 10.0% molybdenum trioxide and 86.5% alumina were prepared as follows: 200 parts by weight of $MoO_3$, 692 parts by weight of grog (calcined alumina) and 1300 parts by weight of hydrated alumina (containing 28% water by weight) were dry mixed in a Simpson mix muller for about ten minutes. A cobalt nitrate solution containing 274 parts by weight of cobalt nitrate dissolved in water was added to the mixture which was then mulled for five more minutes. An aqueous nitric acid solution containing about 13.8 parts by weight of 62% nitric acid was added with an additional 141 parts by weight of hydrated alumina and this mixture was mulled for about ten minutes until a plastic doughy mass was formed which was immediately extruded as ¼ inch x ¼ inch extrusions. These extrusions were dried for three hours at 300° F. and calcined for one hour at 500° F. and for eight hours at 950° F. These extrusions possessed good physical strength with a density of between forty-two and forty-five pounds per cubic foot. It was found upon calcination that the catalyst had shrunk to about 3/16 inch x 3/16 inch extrusions.

50 cc. of these 3/16 inch extrusions were charged to an isothermal reactor comprising a jacketed iron pipe with an internal diameter of ¾ inch. The catalyst was pretreated by passing hydrogen sulfide through the reactor at a temperature of 700° F. for two hours. Thereafter a Midcontinent diesel fuel containing about 0.16% organic sulfur and having an end point of about 700° F. was mixed with hydrogen and passed through the reactor at a temperature of 700° F., a pressure of 300 p.s.i.g., a liquid space velocity of 3 and a hydrogen flow rate of 2000 standard cubic feet per barrel. Liquid space velocity is defined as the volumes of liquid passed over each volume of catalyst per hour. The sulfur in the finished product amounted to about 200 parts per million or a conversion of about 87%. Sulfur determinations were made by the method of Hinsvark and O'Hara as reported in Anal. Chem. 29, 1318–22 (1957).

Catalysts made identically to those of this example but extruded through a 3/16 inch die (which upon calcination shrunk to ⅛ x ⅛ inch extrusions) were tested in the same manner and with the same Midcontinent diesel fuel. The sulfur content of the treated product was 170 p.p.m. which amounts to a sulfur conversion of about 89%.

EXAMPLE 2

50 cc. of a competitive commercial catalyst in the form of 3/16 inch pellets and containing 3.5% cobalt oxide, 10.0% molybdenum trioxide and 86.5% alumina and having a density of about 60 pounds per cubic foot were tested according to the method and utilizing the same feedstock as that described in Example 1. These catalysts were believed to have been prepared by coprecipitation of alumina and molybdena from a solution of aluminum chloride and ammonium molybdate followed by impregnation with cobalt nitrate of the calcined pellets produced from said precipitate. The sulfur content of the treated product was about 270 parts per million which amounts to about an 83% sulfur conversion.

EXAMPLE 3

50 cc. of the ⅛ inch catalyst pellets prepared by the method of Example 1 were tested by the method described therein except that a Kuwait diesel fuel containing about 1.6% organic sulfur was utilized at a liquid space velocity of about 1.5 and a pressure of 600 p.s.i.g. At this space velocity the sulfur in the treated product was analyzed at about 0.15% or about a 91% sulfur conversion.

EXAMPLE 4

50 cc. of the commercial catalyst described in Example 2 was tested with the Kuwait diesel fuel of Example 3 at a liquid space velocity of 1.5. The sulfur in the treated product was reduced from the original 1.6% to about 0.23% which amounts to a sulfur conversion of about 86%.

It will be noted even though the catalyst of this invention was much less dense than that of the catalyst of Example 2 that in each case this catalyst showed marked superiority over the catalyst of the other examples. In other words, even with less catalyst on a weight basis in the reactor, a better conversion of the organic sulfur was achieved with the catalyst prepared according to the method of this invention. These data are tabulated below:

*Table I*

Conditions:
  Temperature_____ 700° F.
  Hydrogen Flow Rate_____ 2000 s.c.f.b.
  Catalyst Composition_____ 3.5% CoO; 10.0% MoO$_3$; 86.5% Al$_2$O$_3$

| Example No. | 1 | 2 | 3 | 4 |
| --- | --- | --- | --- | --- |
| Method of Preparation | Peptized | Coprecipitated | Peptized | Coprecipitated. |
| Density in pounds/cubic foot | 42–45 | 58–62 | 42–45 | 58–62. |
| Pressure, p.s.i.g. | 300 | 300 | 600 | 600. |
| Feedstock | Midcontinent Diesel Fuel. | Midcontinent Diesel Fuel. | Kuwait Diesel Fuel. | Kuwait Diesel Fuel. |
| Sulfur Concentration, percent by weight | 0.16% | 0.16% | 1.6% | 1.6%. |
| Liquid Space Velocity | 3 | 3 | 1.5 | 1.5. |
| Organic Sulfur Conversion | 87–89% | 83% | 91% | 86%. |

For purposes of comparison, the catalyst composition was held constant in all of the examples. However, the concentration of the catalytic constituents may vary over a relatively wide range. For example, on a weight basis, the cobalt oxide in the catalyst may constitute between about 1 and 5% and the molybdenum oxide may constitute about 5 to 50% of the finished catalyst. In all of the examples the molecular ratio of cobalt to molybdenum was about 1:1.2. I have found that by holding the cobalt concentration constant and increasing the molybdenum trioxide concentration to about 15% (resulting in a cobalt to molybdenum ratio on the molecular basis of about 1:1.9) that under the conditions of Example 4 the organic sulfur conversion can be increased to about 95%. As a matter of fact, the optimum ratio of cobalt to molybdenum appears to be about 1:5 on a molecular basis. Similarly the molybdenum trioxide may be held constant and the cobalt oxide lowered to produce a less costly catalyst of equivalent or even superior activity.

The amount of grog utilized may vary appreciably. As a matter of practice, I have obtained good results with about 20–35% by weight of grog in relation to the total amount of carrier. If the grog exceeds about 50% by weight the physical strength of the finished catalyst may suffer. If the grog amounts to less than about 10% the acidified material is rubbery and hard to extrude. Furthermore, if insufficient grog is utilized the extruded pellets shrink excessively upon calcination and are insufficiently active. These properties are dependent to some extent on the nature of the grog. If a plastic material such as kaolin is utilized, the grog may be increased as high as 90%, whereas if a crystalline material such as activated alumina is utilized, the grog should be kept below about 50%. I have found that the addition of kaolin, ball clay or other plastic clay to the mass tends to give the catalyst better heat stability provided that the sodium content of the plastic clay is sufficiently low. It has been found that the sodium content (expressed as Na$_2$O) in the finished catalyst should not exceed 0.15% and preferably should be in the range of 0.04–0.05% by weight.

The amount of acidifying agent may vary over a wide range. I have obtained good results utilizing from 10 to 20 percent of a strong acid such as nitric acid or sulfur acid. Hydrochloric acid may also be used but is disadvantageous because of the highly corrosive effect of the acid upon the mixing equipment. However, mixtures of acids may be utilized and it is sometimes desirable to utilize a minor proportion of an acid of the halogen family to produce a catalyst of greater cracking and isomerization activity. As little as 3% free acid will peptize the mass. However, in this case it has been found that unless the material is worked for a sufficient length of time, a powdery catalyst may result. Normally it is advantageous to utilize a little more acid to cut down the working time. If sulfuric acid is utilized the catalyst may have less initial activity due to the time required for the reduction of the cobalt sulfate to the subsulfide.

Obviously many modifications and variations such as may occur to those skilled in the art may be made without departing from the spirit and scope of this invention and therefore only such limitations as appear in the appended claims should be imposed.

I claim:

1. A method of preparing a hard, porous desulfurization catalyst containing as the active ingredients about 3.5% cobalt oxide and about 10%–15% of molybdenum oxide on inert support consisting of alumina consisting essentially of the steps of mixing in the dry state (1) finely divided molybdenum oxide in the entire amount required in the finished catalyst, (2) porous calcined alumina having a surface area of about 30 to 350 square meters per gram and an average pore diameter in the range of 20 to 100 Angstrom units in an amount of from 10 to 50% of the total carrier in the finished catalyst, (3) hydrated alumina containing 15–35% by weight of combined water of hydration to provide substantially the entire remainder of said carrier, adding to said dry mixture a water solution of cobalt nitrate in an amount to provide the entire cobalt oxide content of the finished catalyst and milling the mixture to form a plastic doughy mass, there being present about 3% to about 20% of strong mineral acid present during this mixing operation, said mineral acid being selected from the group consisting of hydrochloric acid, nitric acid and sulfuric acid, extruding the mass to form a shaped plastic catalyst body, drying said shaped catalyst, calcining at elevated temperatures first at about 500° F. and then at 950° F. for a period of time to decompose the cobalt nitrate.

2. The method of claim 1 wherein said mineral acid is nitric acid and said shaped catalyst is dried for three hours at 300° F. and calcined for one hour at 500° F. and for eight hours at 950° F.

References Cited in the file of this patent

UNITED STATES PATENTS 2,487,466   Nahin _____ Nov. 8, 1949
2,813,837   Holden _____ Nov. 19, 1957